US008106365B2

(12) United States Patent
Perticone et al.

(10) Patent No.: US 8,106,365 B2
(45) Date of Patent: Jan. 31, 2012

(54) IDENTIFYING FISSIONABLE MATERIAL (75) Inventors: David Perticone, Winchester, MA (US); Vitaliy Ziskin, Brighton, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 231 days.

(21) Appl. No.: 12/426,179

(22) Filed: Apr. 17, 2009

(65) Prior Publication Data
US 2009/0321653 A1 Dec. 31, 2009

Related U.S. Application Data (60) Provisional application No. 61/052,072, filed on May 9, 2008, provisional application No. 61/045,997, filed on Apr. 18, 2008.

(51) Int. Cl.
*G21G 1/00* (2006.01)
(52) U.S. Cl. ............... 250/393; 250/370.09; 250/390.01
(58) Field of Classification Search .................. 250/393, 250/370.09, 390.01
See application file for complete search history.

(56) References Cited

U.S. PATENT DOCUMENTS

| | | | |
|---|---|---|---|
| 3,456,113 A | 7/1969 | Keepin | |
| 3,993,910 A | 11/1976 | Parkin et al. | |
| 7,277,521 B2 | 10/2007 | Norman et al. | |
| 7,388,208 B2 | 6/2008 | Deych | |
| 2004/0017888 A1 | 1/2004 | Seppi et al. | |
| 2004/0264628 A1 | 12/2004 | Besson | |
| 2006/0140341 A1 | 6/2006 | Carver et al. | |
| 2006/0227920 A1 | 10/2006 | Maglich | |
| 2007/0001123 A1 | 1/2007 | Andrews et al. | |
| 2007/0102640 A1 | 5/2007 | Ing et al. | |
| 2007/0263767 A1 | 11/2007 | Brondo, Jr. | |
| 2007/0280416 A1 | 12/2007 | Bendahan et al. | |
| 2008/0014643 A1 | 1/2008 | Bjorkholm | |

FOREIGN PATENT DOCUMENTS
WO    WO 2006/036076    4/2006

OTHER PUBLICATIONS

Office of Technology Assessment, Congress of the United States, "Technology Against Terrorism: Structuring Security", (Jan. 1992).
International Search Report and Written Opinion for corresponding International Application No. PCT/US09/41049, mailed Jun. 16, 2009, 10 pages.

*Primary Examiner* — David Porta
*Assistant Examiner* — Djura Malevic
(74) *Attorney, Agent, or Firm* — Fish & Richardson, P.C.

(57) ABSTRACT

Fissionable materials are distinguished from other high-effective atomic number materials by producing dual-energy x-ray radiation sufficient to cause fission in fissionable materials and directing the dual-energy x-ray radiation sufficient to cause fission in fissionable materials towards a physical region. X-ray radiation and a product of fission from the physical region are sensed. An absorption of the dual-energy x-ray radiation by the physical region is determined based on the sensed x-ray radiation, and whether the physical region includes fissionable material is determined based on the presence of a product of fission.

31 Claims, 6 Drawing Sheets

IDENTIFYING FISSIONABLE MATERIAL

CROSS-REFERENCE TO RELATED APPLICATION

This application claims priority to U.S. Provisional Application Ser. No. 61/045,997, titled IDENTIFYING NUCLEAR MATERIAL and filed on Apr. 18, 2008, and U.S. Provisional Application Ser. No. 61/052,072, titled IMAGING SYSTEM and filed on May 9, 2008 both of which are herein incorporated by reference in their entirety.

TECHNICAL FIELD

This disclosure relates to identifying fissionable material.

BACKGROUND

Characteristics of a material may be determined based on the interaction of the material with radiation and neutral particles.

SUMMARY

In one general aspect, a system for detecting the presence of fissionable material includes a source of radiation that is switchable between a screening mode and a verification mode. The source of radiation is configured to produce, in the screening mode, a first type of radiation having a first energy and a second type of radiation having a second energy, the second energy being higher than the first energy, and to direct the first type of radiation and the second type radiation toward a physical region. In the verification mode, the system is configured to produce a third type of radiation, and to direct the third type of radiation toward the physical region, the third type of radiation being sufficient to induce fission in a fissionable material.

The system also includes a sensor system that is configured to sense radiation having the first energy and the second energy from the physical region, and a sensor configured to sense a fission product. The system also includes a processor coupled to a computer-readable storage medium storing instructions that, when executed, capture data from the sensor configured to sense radiation having the first energy and the second energy, determine, for the physical region represented by the captured data, an absorption of the first type of radiation and the second type of radiation, determine whether the physical region is a region of interest based on the absorption, and cause the source of radiation to switch from the screening mode to the verification mode when the physical region is a region of interest.

Implementations may include one or more of the following features. The first type of radiation may be x-ray radiation, and the second type of radiation may be x-ray radiation. To determine whether the physical region is a region of interest based on the absorption, the processor may be operable to determine an effective atomic number of the physical region. The third type of radiation may be x-ray radiation having an energy that is lower than the energy of the first energy. The first type of x-ray radiation may have an energy spectrum with a maximum energy of 6 MeV, the second type of x-ray radiation may have an energy spectrum with a maximum energy of 9 MeV, and the third type of x-ray radiation may have an energy spectrum with a maximum energy of 10 MeV. The first type of radiation, the second type of radiation, and the third type of radiation may be the same type of radiation. The first type of radiation, the second type of radiation, and the third type of radiation may be different types of radiation.

The system also may include a track configured to support the source, and enable the source to move along the track with respect to the physical region. The source and the sensor system may move concurrently with respect to the physical region. The physical region may a region within a larger region, the source may moves with respect to the larger region during the screening mode, and the physical region may be determined to be a region of interest. The source may be moved to the physical region during the verification mode.

The system also may include a photo-neutron conversion target configured to produce, in response to interaction with the third type of radiation, a neutron of sufficient energy to cause fission in a fissionable material. The photo-neutron conversion target may be made of beryllium, deuterium, or lithium. The conversion target may be between the source and the physical region. The conversion target may be coupled to the source. The source of radiation may include a first source of radiation and a second source of radiation that is separate from the first source of radiation. The first source of radiation may produce the first type of radiation and the second type of radiation in the screening mode, and the second source of radiation may produce the third type of radiation in the verification mode.

The first type of radiation, the second type of radiation, and the third type of radiation may be produced by a single source of radiation that is configured to operate in multiple modes, including the screening mode and the verification mode.

In another general aspect, the presence of fissionable material may be detected. A first type of radiation may be directed, from an imaging system in a screening mode, towards a physical region. The first type of radiation has a first energy. A second type of radiation may be directed, from the imaging system in the screening mode, towards the physical region. The second type of radiation has a second energy that is higher than the first energy. An absorption characteristic of the physical region may be determined based on an absorption of the first type of radiation and the second type of radiation by the physical region. Whether the physical region is a region of interest is determined from the absorption characteristic. The imaging system switches from the screening mode to a verification mode in response to determining that the physical region is a region of interest. In the verification mode, a third type of radiation is directed toward the physical region. The third type of radiation is sufficient to induce fission in a fissionable material. Whether a fissionable material is present in the physical region is determined based on an interaction between the third radiation and the physical region.

Implementations may include one or more of the following features. The first type of radiation may be x-ray radiation, the second type of radiation may be x-ray radiation, and the third type of radiation may be a photon or a neutron. Radiation from a fission product emitted from the physical region may be detected after the source of the third type of radiation is turned off. The absorption characteristic may be an effective atomic number. The physical region may be a region of interest. The imaging system may be moved during the screening mode, and the imaging system may be moved to the physical region at the beginning of the verification mode. Fissionable material may be identified.

In another general aspect, an imaging system for discriminating fissionable materials from other high-effective atomic number materials includes a source configured to produce dual-energy x-ray radiation sufficient to cause fission in fissionable materials, and to direct the dual-energy x-ray radiation sufficient to cause fission in fissionable materials towards a physical region. The system also includes a sensor configured to sense x-ray radiation and a product of fission from the physical region, and a processor operable to determine an absorption of the dual-energy x-ray radiation by the physical region based on the sensed x-ray radiation, and to determine whether the physical region includes fissionable material based on the presence of a product of fission.

Implementations of any of the techniques described above may include a method, a process, a system, a device, an apparatus, or instructions stored on a computer-readable medium. The details of one or more implementations are set forth in the accompanying drawings and the description below. Other features will be apparent from the description and drawings, and from the claims.

DETAILED DESCRIPTION

Techniques are described for discriminating fissionable materials from materials that, because they have a relatively high effective atomic number, are of interest but are not fissionable. Many fissionable materials may be weaponizable (e.g., made into a weapon) or pose other types of hazards not necessarily posed by materials having a high effective atomic number. Using a dual-energy x-ray imaging system, a portion of a physical region is determined to be a region of interest if the portion is associated with a high effective atomic number. The region of interest is further examined to determine whether the region of interest includes a fissionable material by exposing the region of interest to a type of radiation that is sufficient to induce fission in a fissionable material. The type of radiation is associated with a particular type of particle (e.g., a neutron or a photon) and an energy spectrum that has a maximum energy. The type of radiation that the region of interest is exposed to may be, for example, a neutron or a photon that has an energy sufficient to cause fission in fissionable materials. In some examples, the type of radiation that is sufficient to induce fission may be x-ray radiation that is produced by the dual-energy x-ray imaging system.

The techniques discussed below may be used, for example, to screen large cargos and/or cargo containers at a seaport, a boarder checkpoint, a rail yard, and/or an airport or to screen smaller cargos that are hand-portable by passengers at a rail station, airport, seaport, and/or bus depot. Thus, the physical region may be all or a portion of such a container or cargo.

In particular, a dual-energy detection system and delayed gamma/neutron nuclear detection techniques are used to identity fissionable material, including, for example, shielded nuclear material. The absorption of x-ray radiation by a material may be used to determine an effective atomic number of the material. High-Z materials (e.g., materials that have a relatively high effective atomic number) are typically materials of interest because high-Z materials (such as lead) may be used to shield hazardous nuclear material or the materials themselves (such as uranium) may be weaponizable. Systems that determine regions of interest based on effective atomic number may produce an alarm and/or a representation of a location of a region of interest when a material having an effective atomic number over a pre-determined threshold is detected. However, in applications that look for fissionable materials, alarms generated for materials that have a high-Z but are not fissionable should be distinguished from alarms generated for materials that are fissionable in order to more accurately and quickly identify fissionable materials.

The techniques discussed below may be used to discriminate between fissionable materials, some of which may be used to make weapons or other hazardous products, and non-fissionable materials that have a high effective atomic number.

Figure 1A:
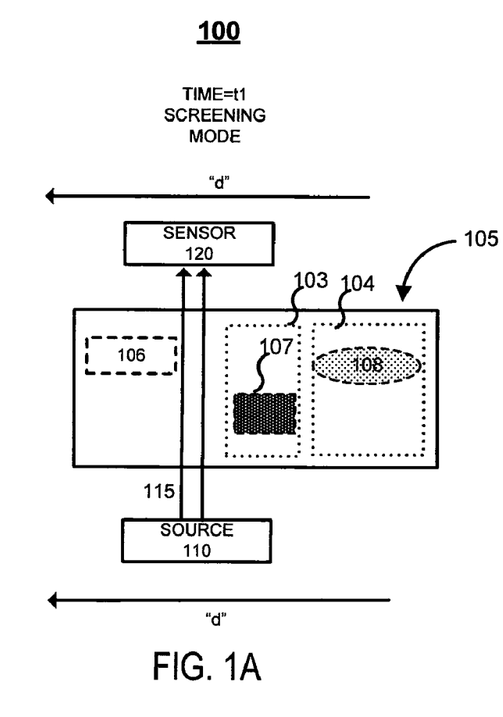
FIGS. 1A-1C, 2, 5, and 6 are plan views of example systems for identifying fissionable materials.
Figure 1B:
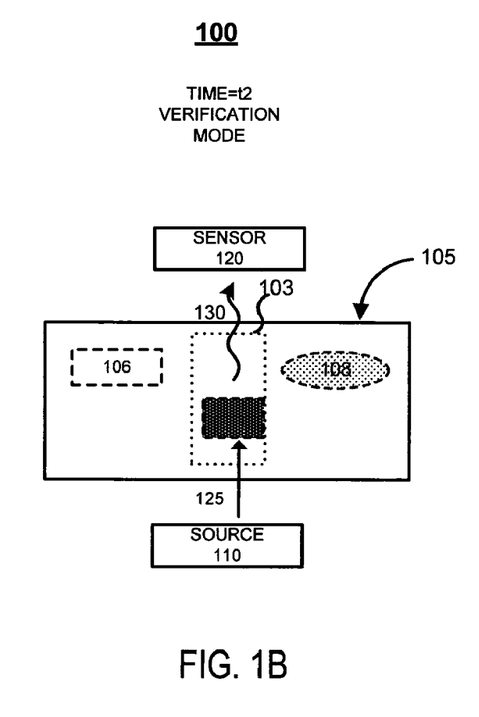
Figure 1C:
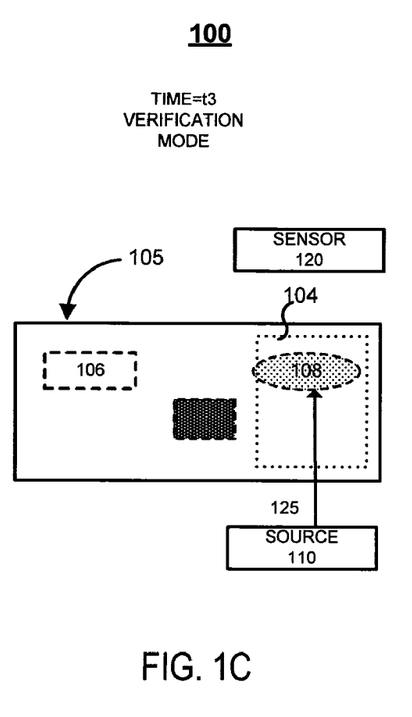

FIGS. 1A-1C illustrate a plan view of an example system 100 for discriminating fissionable materials from non-fissionable materials that have a relatively high effective atomic number. In the example of FIG. 1A, the system 100 is operating in a screening mode at a time "t1" and, in FIGS. 1B and 1C, the system 100 is operating in a verification mode at times "t2" and "t3." As discussed in more detail below, in the screening mode, the system 100 determines whether a physical region 105 includes a region of interest by scanning the physical region 105, or a portion of the physical region 105, with dual-energy x-ray radiation from a source 110 to determine whether the physical region 105, or the portion of the physical region 105, includes a region that has a high effective atomic number (e.g., a region having a Z of seventy-two or greater).

In the verification mode, the system 100 scans one or more regions of interest identified in the screening mode with a type of radiation that causes fission in fissionable materials. For example, the type of radiation may be a beam of neutral particles sufficient to first cause fission and then the production of delayed fission product radiation in a fissionable material. The type of radiation may be the same as the energy used in the scanning mode. The system 100 determines whether the regions of interest include a fissionable material.

Figure 2:
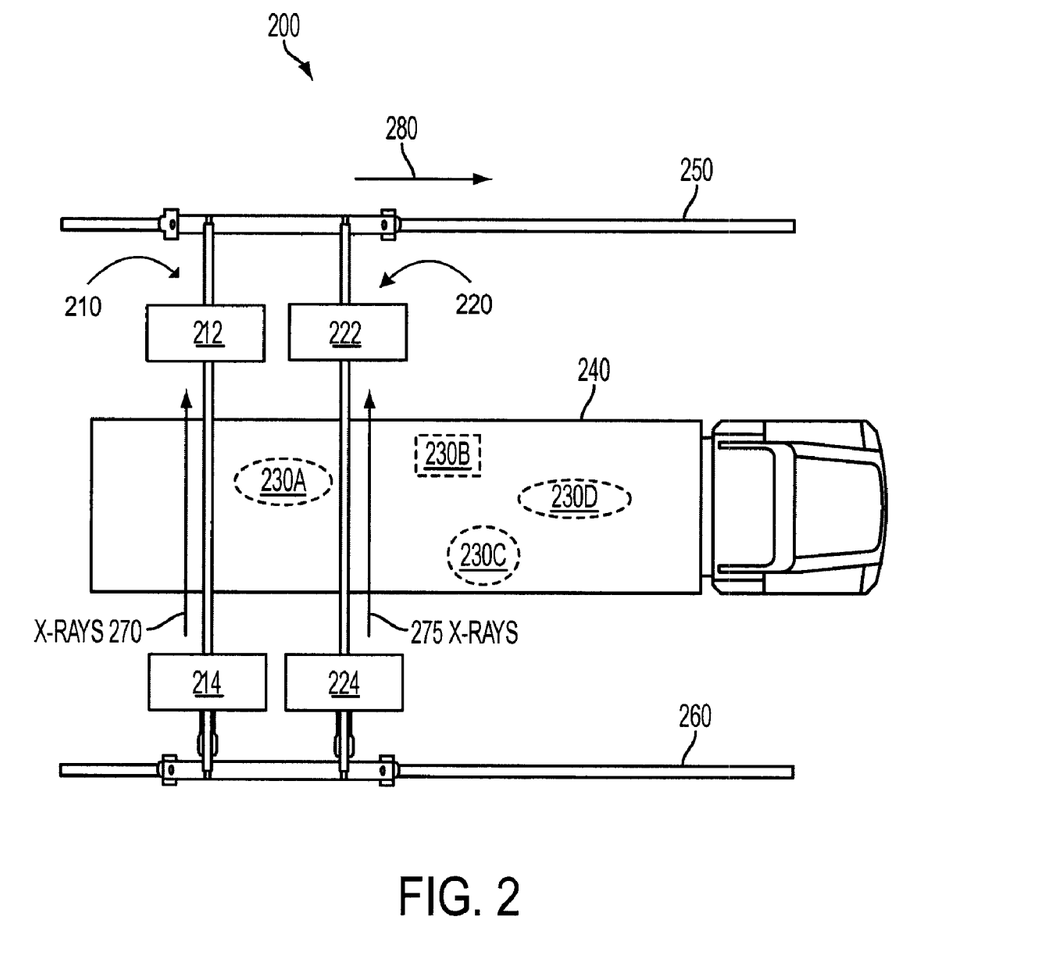

As discussed in greater detail with respect to FIG. 2, the effective atomic number of materials in the physical region 105 may be determined based on the absorption of the x-ray radiation by the materials. A portion of the physical region 105 may be identified as a region of interest if the portion is associated with a relatively high effective atomic number (Z). For example, materials having a high effective atomic number (e.g., materials having a "Z" of 72 or above), such as lead and uranium, tend to be materials of interest because such materials may be used for shielding of hazardous materials or may themselves pose a threat.

However, a high effective atomic number does not definitively indicate whether the material is a fissionable material that may be used to make a weapon or otherwise pose a significant threat. For example, both lead and uranium have high effective atomic numbers (Z=82 and Z=92, respectively). However, lead is not weaponizable, whereas some forms of uranium are weaponizable. Thus, by performing a second scan of the identified region of interest with radiation capable of inducing fission in fissionable materials, the presence of fissionable material in the region of interest may be determined. For example, after the region of interest is identified in the screening mode, a type of radiation sufficient to cause fission in fissionable materials may be directed toward the region of interest. For example, the type of radiation may be neutrons that are produced using a photo-neutron conversion target. In this example, interactions between the incident neutrons and materials in the region of interest causes fission and the production of delayed fission products if fissionable materials are present in the region of interest. In another example, the type of radiation may be the same as that used during the screening mode. In these examples, one of the two x-ray beams generated by the dual-energy x-ray system may be switched to a higher energy level (such as 10 MeV) and directed toward the region of interest.

Fission is an exothermic reaction in which the nucleus of an atom splits into smaller parts. Fission may release energy as both electromagnetic radiation in the form of gamma rays and as kinetic energy in the form of free neutrons that are released from the fission reaction. Detection of delayed fission products (e.g., gamma rays and/or neutrons) from the region of interest indicates the presence of a fissionable material. The delayed fission products may be fission products that are emitted from the region of interest after the incident neutral particles provided by the source have been extinguished. Accordingly, fissionable materials may be distinguished from among other materials in the physical region that have a high effective atomic number. In some implementations, the region of interest also may be exposed to neutrons of different energies, a "slow" neutron that only induces fission in weaponizable materials and a "fast" neutron that induces fission in all, or almost all, fissionable materials. In these implementations, the fissionable materials in the region of interest may be further separated into weaponizable materials and non-weaponizable materials. The weaponizable material may be a special nuclear material (SNM).

In the example shown in FIGS. 1A-1C, the physical region includes objects 106, 107, and 108. The object 106 is an innocuous object that does not have a high effective atomic number and is not fissionable. The object 106 may be, for example, a cardboard box full of foam peanuts that protect a set of glassware. The object 107 is uranium and the object 108 is lead. Thus, the objects 107 and 108 have high effective atomic numbers, and the system 100 identifies a region 103 in the vicinity of the object 107 and a region 104 in the vicinity of the object 108 as regions of interest during the screening mode. However, during the verification mode, only the uranium object 107 is identified as a fissionable material.

The system 100 includes a source 110 and a sensor 120. The source 110 is switchable between the screening mode and the verification mode. During the screening mode, the source 110 emits x-ray radiation at two different energies. The two different energies used in the screening mode may be x-rays having an energy spectrum with a maximum energy of between, for example, four Mega-electron volts (MeV) and ten MeV. In other examples, and in the verification mode, the source may produce radiation having an energy spectrum with a maximum energy above 10 MeV and/or below 4 MeV. The x-ray radiation at the two different energies may be referred to as a dual-energy x-ray 115. The source 110 may include two x-ray sources, each of which produce radiation at a fixed energy level, or the source 110 may include one x-ray source that operates at one of a few selectable energies.

The sensor 120 is a sensor that is sensitive to x-ray radiation (e.g., the sensor 120 produces an electrical or light signal to indicate detection of x-ray radiation) and to products of fission. In some implementations, the sensor 120 includes more than one detector and/or sensor. The sensor 120 may be considered to be a sensor system that includes detectors that are sensitive to x-ray radiation and detectors that are sensitive to fission products.

In the screening mode, the source 110 directs the dual-energy x-ray 115 toward to the physical region 105, the dual-energy x-ray 115 passes through the physical region 105 while being attenuated by materials within the physical region 105, and exits the physical region 105 toward the sensor 120. If the physical region 105 is partially or completely enclosed by a container (not shown), the dual-energy x-ray 115 has sufficient energy to penetrate the container and enter the space within the container. The sensor 120 detects the attenuated dual-energy x-ray radiation and creates two images of the physical region 105 based on the attenuated dual-energy x-ray radiation. One of the images is an image that represents the absorption of x-ray radiation at the first energy level by the physical region 105, and the second image represents the absorption of x-ray radiation at the second energy level by the physical region 105. The absorption characteristics of the physical region 105, such as the effective atomic number of the region 105, may be determined from the sensed attenuated x-ray radiation. The uranium object 107 and the lead object 108 are identified as being or including materials of a high effective atomic number and are respectively flagged as the regions of interest 103 and 104.

Referring to FIG. 1A, the source 110 and the sensor 120 move with respect to the physical region 105 in a direction "d," which allows the entire physical region 105 to be imaged during the screening mode. In other implementations, the source 110 and the sensor 120 may be fixed and the physical region 105 may move with respect to the source 110 and the sensor 120. A portion of the physical region 105, rather than the entire physical region 105, may be imaged in the screening mode.

The source 110 also emits radiation sufficient to cause fission in fissionable materials, and the fission produces fission products (e.g., free neutrons and/or gamma rays). In the screening mode, the regions of interest 103 and 104, which respectively include the object 107 and the object 108, were identified. Upon receiving an indication that a region of interest is present, the source 110 switches from the screening mode to the verification mode and the source 110 moves to the a location corresponding to the region of interest that was identified in the screening mode. The source 110 and the sensor 120 may move concurrently and in tandem together. In some implementations, the physical region 105 moves such that an identified region of interest is positioned in front of the source 110.

Referring to FIG. 1B, in the verification mode, the source 110 emits radiation 125 toward the region of interest 103, which includes the uranium object 107. The radiation 125 is a type of radiation that is sufficient to cause fission in fissionable materials. The type of radiation 125 is defined by a particle type and an energy spectrum. For example, the radiation 125 may be a beam of neutral particles (e.g., a beam of neutrons or photons) that have an energy sufficient to cause fission in fissionable materials. As discussed in more detail with respect to FIGS. 2 and 6, in examples in which the radiation is a beam of neutrons, the radiation 125 may be created by switching the energy level of one of the x-rays to a lower energy level and causing the emitted x-ray to interact with a photo-neutron conversion target (not shown). The photo-neutron conversion target emits neutrons in response to being struck by photons having sufficient energy to eject a neutron from a nucleus of the material that makes up the photo-conversion target. The photo-neutron conversion target also may be referred to as the conversion target. The photons that strike the conversion target are produced by striking a bremsstrahlung target with a beam of electrons. The generated photons then strike the conversion target. Because the eventual conversion to neutrons involves the used of both the tungsten target and the photo-neutron conversion target, the conversion target also may be considered a secondary target, and the bremsstrahlung target may be considered a primary target. In some implementations, the energy from the source 110 may be increased to ten MeV or greater to create the radiation 125 without the use of a conversion target.

At the time "t2," the radiation 125 travels into the physical region 105 and strikes the object 107. Because uranium is a fissionable material, fission begins and fission products 130, in addition to neutrons that may be present in the radiation 125, are released from the physical region 125 and sensed by the sensor 120. The fission reaction causes prompt fission products and delayed fission products. The delayed fission products may be daughter neutrons that are released from the fission reaction with the uranium object 107, and the delayed fission products may be present even after the radiation 125 is extinguished (e.g., after the source 110 is turned off or directed away from the physical region 105). For example, the delayed fission products may be present 10 milliseconds (ms) after the radiation 125 is extinguished. The presence of the delayed fission products indicates that, in addition to being a high-Z material, the object 107 is also a fissionable material. In some implementations, the prompt fission products also may be detected.

Referring to FIG. 1C, at a time "t3," the source 110 is still operating in the verification mode, and the source 110 and the detector 120 move to a location corresponding to the region of interest 104. The region of interest 104 includes the lead object 108. The source 110 emits the radiation 125 toward the region of interest 104. In contrast to the uranium object 107, the lead object 108 is not a fissionable material, and, thus, fission products are not created from the interaction between the radiation 125 and the lead object 108. Although, in examples where the radiation 125 is a type of radiation having neutron particles, the sensor 120 may detect the presence of neutrons while the radiation 125 illuminates the region of interest 104, no delayed fission products are detected at the sensor 120. Accordingly, the lead object 108 is not identified as a fissionable material.

Thus, the system 100 may be used to distinguish between high-Z materials that are fissionable and those that are non-fissionable.

In the example shown in FIGS. 1A-1C, the physical region 105 is scanned in the screening mode and regions of interest 103 and 104 are identified. The regions of interest 103 and 104 are scanned again in the verification mode, which occurs after the scanning of the physical region 105. However, in other examples, the verification of each region of interest may occur immediately, or soon after, the region of interest is identified. Thus, in some implementations, the sensor 110 may switch from the screening mode to the verification mode before the entire physical region 105 is screened. Additionally, the sensor 110 may switch from the verification mode back to the screening mode.

FIG. 2 illustrates a plan view of an example system 200 in which two separate imaging systems 210 and 220 generate and detect x-rays 270 and 275 that have two different energies. The two different energies may be, for example two energies between 4 MeV and 10 MeV. The example system 200 may be referred to as a dual energy system and represents only an example configuration of a dual energy system. The example system 200 also includes a post-screener linac that may be used to expose regions of interest identified by the dual-energy system to radiation sufficient to cause fission in fissionable materials. In the example shown in FIG. 2, the post-screener linac is part of the dual-energy system. In particular, either or both the sources 212 and 224 includes a source that has an adjustable energy level, and the source may be set to emit an energy that is sufficient to cause fission in fissionable materials. In some implementations, the post-screener linac may be a separate from the imaging systems 210 and 220.

Referring to FIG. 2, the x-rays 270 and 275 interact with objects 230A-230D after passing through a surface of a container 240 in which the objects 230-230D are located. X-ray radiation that is not absorbed by the objects 230A-230D or the container 240 are sensed by detectors 212 and 222. Detection of the x-ray radiation that is not absorbed by the objects 230A-230D allows determination of characteristics of the materials that make up the objects 230A-230D. For example, and as described below, a characteristic related to the effective atomic number of the materials that make up the objects 230A-230D may be determined based on the absorption of x-ray radiation by the materials. The effective atomic number may be used to determine whether the objects 230A-230D may include contraband or hazardous items, such as nuclear material. For example, items having a relatively high effective atomic number (e.g., a Z of 72 or greater), may be an item of interest.

An alarm, alert, or other indicator may be provided in response to a determination that the objects 230A-230D include a high-Z material. The indicator includes a location corresponding to the material such that the post-screener linac may be moved to the region of interest (or the container 240 moved relative to the dual-energy system) to scan the region of interest and determine whether the region of interest includes fissionable materials.

In the example shown, the container 240 is a truck. However, the container 240 may be any type of vessel. In some cases, the container 240 is a large container used in the transportation system, such as, for example, a shipping container, a rail car, or an automobile. In other examples, the container 240 also may be a smaller container, such as a suitcase, a package, a trunk or even a smaller item.

The imaging systems 210 and 220 each include a source that generates X-rays having a particular energy and a detector that senses X-rays having that particular energy level. In particular, the imaging system 210 includes a detector 212 and a source 214, and the imaging system 220 includes a detector 222 and a source 224. The sources 214 and 224 may be, for example, Varian Linatron M9 X-ray® sources available from Varian Medical Systems of Las Vegas, Nev. The sources 214 and 224 may operate at either a fixed energy level or at one of a few, selectable energy levels. In the example shown in FIG. 2, the imaging systems 210 and 220 are mounted on a gantry and the imaging systems 210 and 220 move concurrently along rails 250 and 260. The imaging systems 210 and 220 scan the container with x-rays 270 and 275 as the imaging systems 210 and 220 move along the rails 250 and 260 in a direction 280. In the example shown, the imaging systems 210 and 220 are physically connected such that they move in tandem. However, in some implementations the imaging systems 210 and 220 may move independently of each other. In these implementations, the imaging systems 210 and 220 may be configured to be connected to each other and disconnected from each other as required. The detectors 212 and 222 sense radiation that is not absorbed by the objects 230A-230D such that images of the objects 230A-230D may be created.

X-rays 270 generated by the source 214 pass through the container 240 and interact With the objects 230A-230D. X-rays that are not absorbed by the objects 230A-230D reach the detector 212. Similarly, x-rays 275 generated by the source 224 that are not absorbed by the objects 230A-230D reach the detector 222. In general, the efficiency of a material in absorbing X-ray radiation provides an indication of the effective atomic number ("Z") of the material. Thus, the amount of X-ray radiation reaching the detectors 212 and 222 provides an indication of how the materials that make up the objects 230A-230D absorb radiation, which also provides an indication of the effective atomic number of the materials.

The rate at which materials absorb x-rays depends on the energy and the material. Thus, by comparing the amount of absorption by a material exposed to a lower-energy x-ray to the amount of absorption by the material when the material is exposed to a higher-energy x-ray, an indication of the effective atomic number of the material may be determined. If one material is present, the effective atomic number of the material may be determined from the comparison. When more than one material is present, various processing techniques may be applied to determine the effective atomic number of a particular material. Also, when more than one material is present, the average effective atomic number of the materials present may be determined from the comparison. At both lower energies and higher energies, high-Z materials, such as lead, are more attenuating (e.g., absorb more x-rays) than low-Z materials, such as concrete and organic goods. At lower energies, the increased absorption is due to the Compton effect. At higher energies, the increased absorption is due to pair-production.

Thus, images of the low-Z material formed from the radiation detected as a result of exposure of the low-Z material to the higher-energy x-ray are distinguishable from images formed from the radiation detected as a result of exposure of the low-Z material to the lower-energy x-ray. In particular, the images of the low-Z material formed from exposure to the higher-energy x-ray may appear lighter as a result in a change in the amount of signal that passes through the material (e.g., the images formed from exposure to the higher-energy x-rays have a lower relative intensity as compared to the images formed from exposure to the lower-energy x-rays).

The relative change in intensity of the signal is dependent on material and the energies used. For example, low-Z and high-Z materials both absorb the lower-energy x-ray; however, only high-Z materials absorb the higher-energy x-ray. Thus, the images of the low-Z materials and the high-Z materials formed from exposure to the lower-energy x-ray are similar, but the images formed from exposure to the higher-energy x-ray are not (the high-Z material appears dark while the low-Z material appears lighter). Accordingly, comparison of an image of an object formed from interaction between a lower-energy x-ray and the object with an image of the object formed from the interaction between a higher-energy x-ray allows a determination of whether the material that compose the object is a high-Z material. In this example, the higher-energy x-ray may have a peak energy of 9 MeV, and the lower-energy x-ray may have a peak energy of 6 MeV.

The system 200 may be used to perform such a comparison. For example, the source 214 may generate a lower-energy x-ray that interacts with the objects 230A-230D. The radiation from the source 214 that is not absorbed by the objects 230A-230D is sensed by the detector 212. An image of the lower-energy x-ray interaction may be formed based on the sensed radiation. Similarly, the source 224 may generate a higher-energy x-ray that interacts with the objects 230A-230D. The radiation from the source 224 that is not absorbed by the objects 230A-230D is sensed by the detector 222. An image of the higher-energy x-ray interaction may be formed from the sensed radiation. The image of the lower-energy x-ray interaction and the image of the higher-energy x-ray interaction are aligned (or registered with each other) such that the corresponding portions of the objects 230A-230D in the images may be compared. More particularly, these images are aligned to account for the displacement of the imaging systems 210 and 220 along the direction 280 and are compared to determine if high-Z materials are present in the image.

Because the imaging systems 210 and 220 are distinct imaging systems, the detectors 212 and 222 may be individually optimized for the sources 214 and 224, respectively. For example, use of the separate imaging systems 210 and 220 allows the detector 222, which is associated with the lower-energy source 224 in this example, to be larger than the detector 212. Because the photons in the lower-energy x-ray are less energetic than the photons in the higher-energy x-ray, the lower-energy beam is less penetrating. Thus, having the detector 222 be larger than the detector 212 may increase the number of lower-energy photons that are detected by the detector 222. Increasing the number of lower-energy photons may improve the image formed from the interaction with the lower-energy x-ray, which also may improve the comparison of the lower-energy image and the higher-energy image.

Moreover, the use of the imaging systems 210 and 220 also may allow the sources 214 and 224 to be individually optimized to generate x-rays having a particular peak energy. The peak energy may be considered the maximum energy. For example, the sources 214 and 224 may be separately filtered to more precisely achieve generation of a particular energy, or band of energies, or to remove certain energies from the generated x-ray radiation. Such filtering may improve the quality of both the lower-energy image and the higher-energy image, which may improve the results of the comparison. Additionally, because the imaging systems 210 and 220 each have a source that generates x-rays, the overall number of photons available to interact with the objects 230A-230D is increased as compared to a system that has one x-ray source. Thus, using the sources 212 and 222 may improve the images generated by the imaging systems 210 and 220 by increasing the signal received by the detectors 212 and 222.

Thus, the dual-energy system discussed above, which may be referred to as a pre-screening linac is used to identify regions of high-Z materials, and these regions may be referred to as regions of interest. In some implementations, a dual energy system at the MeV level (such as the dual-energy system discussed above) and a post-screener linac may be used to determined whether the regions of high Z material(s), which may be referred to as region(s) of interest, also include fissionable materials.

Once a region of interest is identified, the energy of the pre-screener linac is changed to 10 MeV, the linac is moved to the region of interest, the region of interest is exposed to the 10 MeV beam, and specific material in the region of interest (or object or cargo) is identified by counting gammas and neutrons some time after the post-screener linac pulse has ended. Presence of a delayed neutron/gamma signal indicates a material of interest, which may be, for example, a nuclear material. Stated differently, shielded nuclear material detection may be based on detected delayed neutron/gamma signals from the region of interest (or object or cargo) that is consistent with photon or neutron induced fission. For example, photon detection for above 3 MeV and below 1 MeV neutrons may be made with high specificity. These techniques may help detect special nuclear material at the Z and isotopic level.

In one example implementation, the dual energy system 200 of FIG. 2 with additional neutron/photon detectors and electronics may be used. In other implementations, the dual-energy system may use one of the sources 214 or 224 to generate high-energy photons from, for example, a pulsed laser integrated with one the sources 214 or 224. In other implementations, the energy of one of the sources 214 or 224 may be changed and the radiation produces by the source may interact with a photo-neutron conversion target such as deuterium, beryllium, or lithium. The photo-neutron conversion target creates neutrons from photo-neutron production. In particular, an electron beam strikes a tungsten target to produce photons. The photons interact with the conversion target and, if the photons have sufficient energy, the interactions between the photons and the conversion target produces neutrons by ejecting a neutron from the nucleus of an atom of the material from which the target is made.

In some implementations, the type of radiation sufficient to cause fission may be considered a neutron or photon probes, and the probe may be based on the background Z determined. Neutron or photon probes may work best in different backgrounds. In some implementations, the predetermination of a region of high Z material may reduce the dose of neutron or photon probe needed. Some implementations may uniquely identify 100 $cm^3$ of highly enriched uranium (HEU) and weapons-grade plutonium (WGPu), with or without shielding. In another example, some implementations may distinguish uranian-235 ($U^{235}$) from uranium-238 ($U^{238}$), which may require measurement beyond Z or fission. Some implementations may be configured to detect an enhanced fission rate or to detect relatively low energy neutron fission (e.g., fission that occurs as a result of radiation by a 1 MeV neutron). In these implementations, a "fast" neutron (e.g., a neutron having an energy greater than about 1.5 MeV) and a "slow" neutron (e.g., a neutron having an energy less than 1.5 MeV) are both directed toward the region of interest. The "slow" neutron causes fission in weaponizable materials (which may be special nuclear materials) but not in other fissionable materials. Thus, use of both the "slow" and "fast" neutrons may allow special nuclear materials to be distinguished from other fissionable materials. As discussed in more detail below with respect to FIG. 6, in implementations that use two separate sources (such as the sources 214 and 224), the radiation from the two sources may be used to interact with two separate targets made from different materials to produce neutrons of different energies (e.g., a "slow" neutron and a "fast" neutron).

Figure 3:
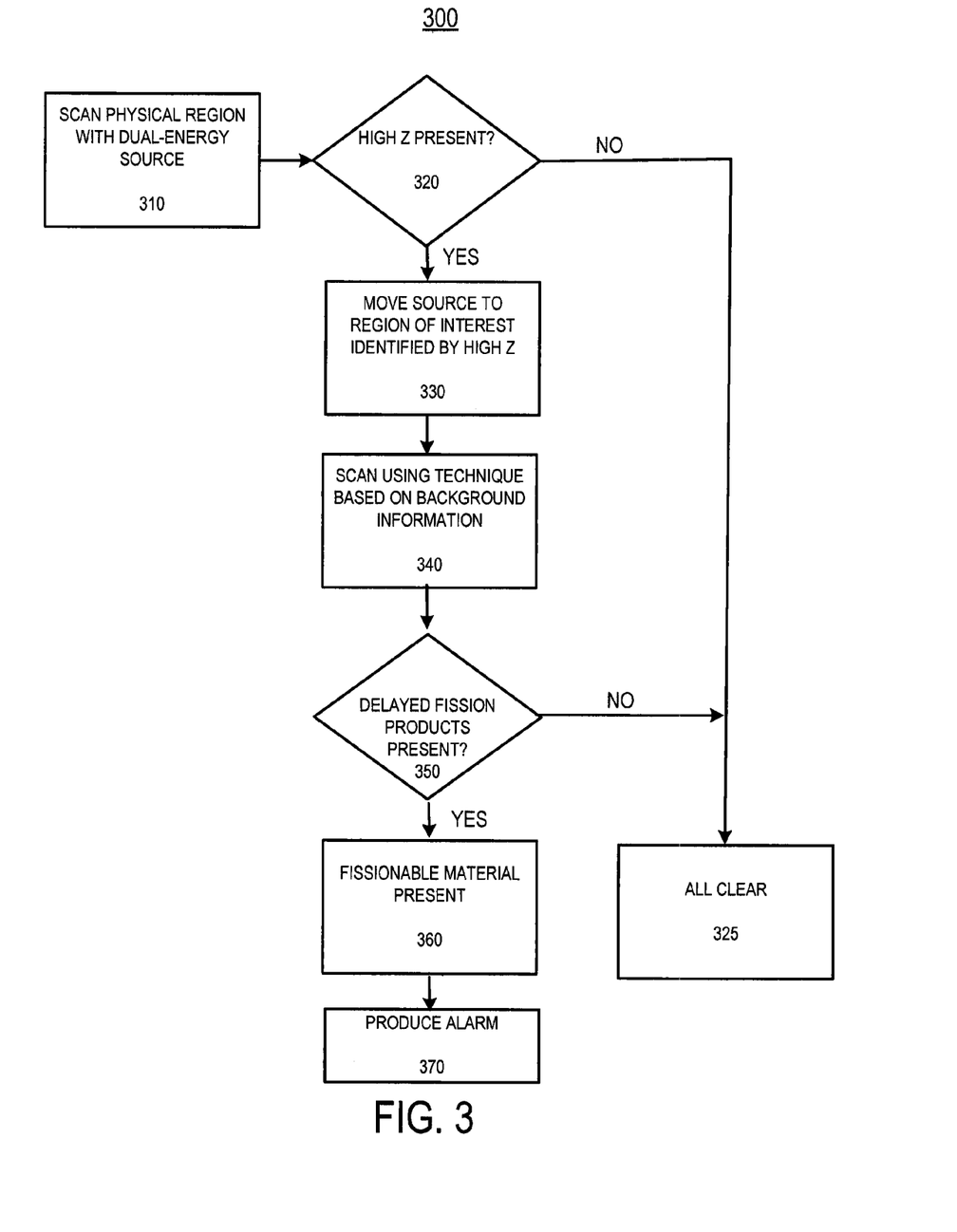
FIG. 3 shows an example process for identifying fissionable materials.

FIG. 3 presents an example process 300 that may be implemented by a dual energy detection system that uses delayed gamma/neutron nuclear detection techniques. The process 300 may be performed using a system such as the system 100 or the system 200 discussed above with respect to FIGS. 1A-1C and 2.

A physical region (such as the physical region 105 or the truck 240) is scanned with a dual-energy source (310). The physical region may be scanned with x-ray radiation of two different energy levels during a screening mode. For example, the physical region may be scanned with two sources (such as the sources 214 and 224 discussed above with respect to FIG. 2) that are mounted on a gantry and that move concurrently with each other and with respect to the physical region such that the physical region is irradiated with radiation from the first source and then with radiation from the second source. In some implementations, the physical region moves with respect to the sources. The x-rays of both energy levels travel through the physical region and are attenuated. The attenuated x-rays are sensed with sensors (such as the sensors 212 and 222), and the sensed radiation is used to produce images of the absorption of the lower energy x-ray radiation and the higher energy x-ray radiation by the physical region. The images are compared as discussed above to determine an estimation of the effective atomic number of various portions of the physical region.

Based on the estimated effective atomic number, it is determined whether a high-Z material is present in the physical region (320). A portion of the physical region having an estimated effective atomic number of seventy-two or more may be determined to include a high-Z material. Materials having a relatively high effective atomic number may be of interest because such materials may be used as shields for nuclear materials or such materials may be nuclear materials. To determine whether a high-Z material is present in the physical region, the estimated Z may be compared to a pre-determined threshold value. The pre-determined threshold value may be stored in an electronic storage, and the pre-determined threshold value may be adjustable by an operator of the system.

If high-Z regions are present, the regions of high-Z are considered to be regions of interest, and the location of the high-Z regions of interest is determined based on the images produced by the detectors. If the physical region does not include any portions that have a high-Z, an "all-clear" indicator is presented (325). The "all-clear" indicator may be, for example, an alarm, message, or signal that indicates that the physical region does not include a high-Z material. Once the "all-clear" indicator is produced, the another physical region may be screened.

If high-Z portions are present, the source (such as the source 110 or one or more of the sources 214 and 224) are moved, in a verification mode, to a location that corresponds to a location of a region of interest (330). In some implementations, the physical region is moved with respect to the source such that the region of interest is positioned to receive radiation from the source. In some implementations, a source that is separate from the source that produces the dual-energy x-rays is moved to the location corresponding to the region of interest.

The region of interest is scanned using a technique that is based on characteristics of the background of the physical region (340). The region of interest is exposed to neutral particles (e.g., photons or neutrons) of sufficient energy to cause fission in fissionable materials. Scanning the region of interest with neutral particles and then detecting for the presence of delayed fission products allows high-Z materials that are also fissionable materials to be separated from high-Z materials that are not fissionable. The characteristics of the background may indicate the type of photon or neutron probes to use to probe the region of interest for the presence of fissionable materials. For example, if the region of interest has a relatively high effective atomic number, a lower-dose (e.g., lower energy) photon or neutron radiation may be used to cause fission as compared to the photon or neutron radiation energy needed to cause fission in a material having a lower effective atomic number.

In some implementations, the neutral particles used to probe the region of interest for fissionable materials is produced by switching the source from the higher-energy level used in the dual-energy scan to a mode in which the source produces a 10 MeV beam of radiation (e.g., a beam of radiation having an energy spectrum with a maximum energy of 10 MeV), and the 10 MeV beam of radiation is directed toward the region of interest. In some implementations, the source includes two separate sources of x-ray radiation (such as the sources 214 and 224), and each of the sources is switched to a different energy level (e.g., switched to produce energy having a different energy spectrum and a different maximum energy). For example, in the screening mode, the source 214 may produce x-ray radiation of 6 MeV and the source 224 may produce radiation of 9 MeV. In the verification mode, the source 214 may be switched to produce 4 MeV radiation, and the source 224 may be switched to produce 9 MeV radiation. The radiation from the source 214 may be directed toward a conversion target that produces neutrons in response to being struck by photons having energy sufficient to eject a neutron from a nucleus of an atom of the material from which the conversion target is made. Thus, in this example, the neutral particles used to probe the region of interest for the presence of fissionable materials are the neutrons produced by the interaction between the 4 MeV radiation and the conversion target. The conversion target may be, for example, beryllium, lithium, or deuterium.

The presence of delayed fission products is determined (350). The presence of delayed fission products (e.g., gamma rays or neutrons emitted from the region of interest after the probe that exposes the region of interest to neutral particles is removed) indicates that the region of interest includes a fissionable material. The delayed fission products may be, for example, daughter neutrons that are produced as the nuclei of fissionable materials in the region of interest split apart. These daughter neutrons are detected (at a detector such as the sensor 120) at a time after the incident neutral particles are removed and the daughter neutrons indicate the presence of a fissionable material. If no delayed fission products are detected, the "all-clear" indicator is presented (325). If delayed fission products are detector, fissionable material is present (360) and an alarm is produced (370). The alarm may be, for example, a sound, a message displayed to an operator of the system, a visual but non-audio warning, or an automated alert (such as an e-mail or text message sent to an operator of the system or to an automated process).

Figure 4:
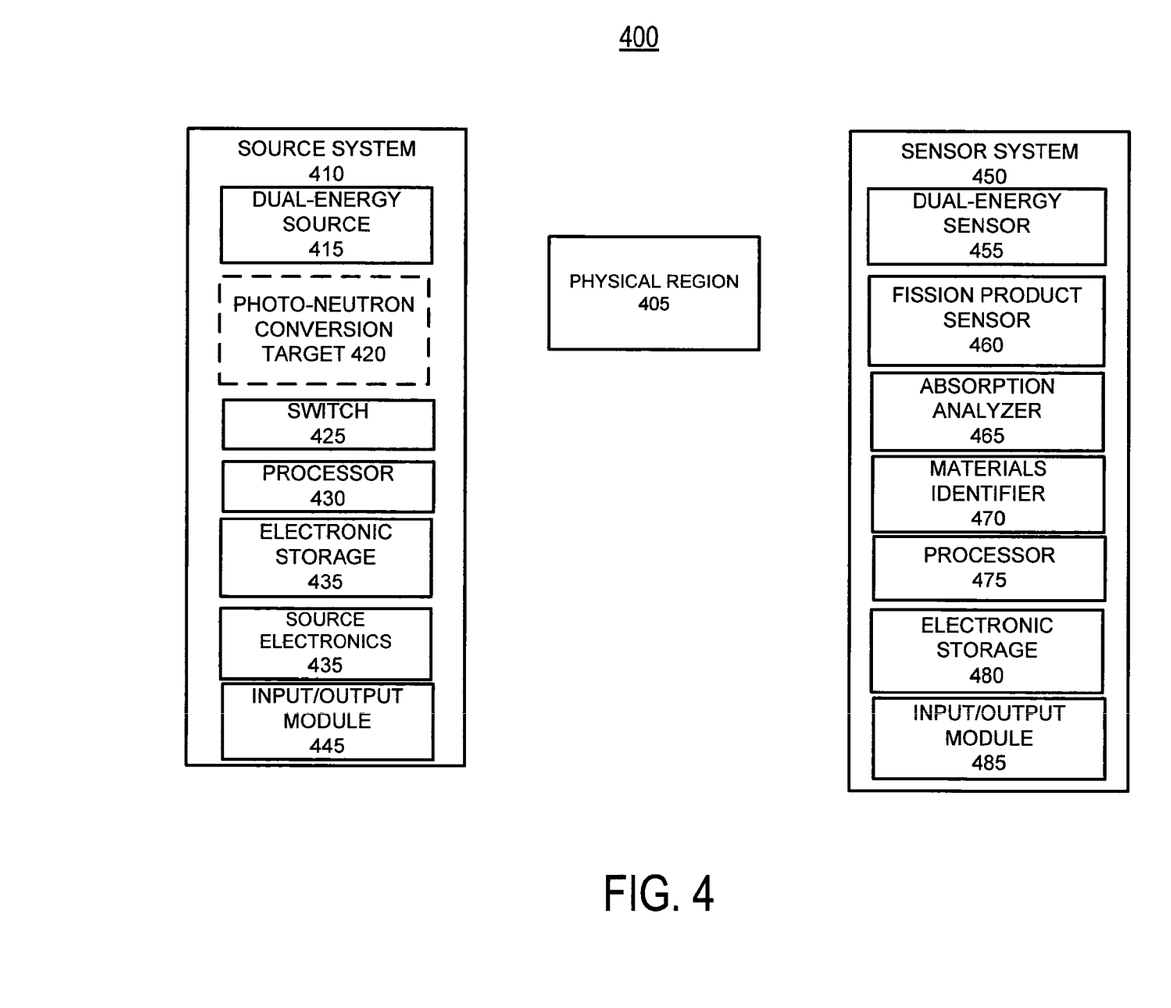
FIG. 4 is a block diagram of an example system for identifying fissionable materials.

FIG. 4 shows a block diagram of a system 400 used to identify fissionable materials. The system 400 includes a source system 410 and sensor system 450. Together, the source system 410 and the sensor system 450 determine whether a physical region 405 includes materials having a high effective atomic number and determine whether any such materials are fissionable materials. The source system 410 includes a dual-energy x-ray source 415 that produces a lower-energy x-ray (e.g., an x-ray of 6 MeV) and a higher-energy x-ray (e.g., an x-ray of 9 MeV) in order to determine an effective atomic number of a physical region 405. The source system 410 may include a photo-neutron conversion target 420 made of a material that produces neutrons in response to being struck with photons. The photo-neutron conversion target 420 may be made from beryllium, lithium, or deuterium.

The source system 410 also may include a switch 425 that switches the source system 410 from a screening mode in which the source system 410 produces dual-energy x-ray radiation to a verification mode in which the source system 410 produces a type of radiation that is sufficient to cause fission in fissionable materials. The type of radiation may be the same type of radiation as radiation produced by the dual-energy x-ray system. The switch 425 may be activated upon receipt of a location, or other indication, of a region of interest identified in the screening mode. The verification mode is used to determine whether the region of interest includes fissionable materials.

The source system 410 also includes a processor 430, an electronic storage 435, source electronics 440, and an input/output module 445. The electronic storage 435 stores instructions, that when executed, cause the switch 425 to transition the source system 410 from the screening mode to the verification mode in response to receiving an indication of the presence of one or more regions of interest from the sensor system 450, from the electronic storage 435, or from an operator of the system 400. The processor also may cause the source system 410 to switch from the verification mode to the screening mode.

The electronic storage 435 is an electronic memory module, and the electronic storage 435 may be a non-volatile or persistent memory. The processor 430 may be a processor suitable for the execution of a computer program such as a general or special purpose microprocessor, and any one or more processors of any kind of digital computer. Generally, a processor receives instructions and data from a read-only memory or a random access memory or both. The processor 430 receives instruction and data from the components of the source system 410 and/or the sensor system 450, such as, for example, a location and/or other indication of the presence of a region of interest that causes the source system 410 to switch from the screening mode to the verification mode. In some implementations, the source system 410 includes more than one processor.

The input/output module 445 may be any device able to transmit data to, and receive data from, the source system 410. For example, the input/output device 445 may be a mouse, a touch screen, a stylus, a keyboard, or any other device that enables a user to interact with the source system 410. In some implementations, the input/output device 445 may be configured to receive an input from an automated process or a machine and/or configured to provide an output to an automated process or a machine.

The system 400 also includes the sensor system 450. The sensor system 450 senses attenuated dual-energy x-ray radiation and fission products that emanates from the physical region 405 due to the irradiation of the physical region 405 by the source system 410.

The sensor system 450 includes a dual-energy sensor 455, a fission product sensor 460, an absorption analyzer 465, a materials identifier 470, a processor 475, an electronic storage 480, and an input/output module 485. The dual-energy sensor 455 includes a sensor that is sensitive to the energy spectra present in the x-ray radiation produced by the dual-energy source 415. The dual-energy sensor 455 may be a scintillator that senses x-ray radiation emitted from the physical region 405 and produces a visible light signal in response. The intensity of the visible light signal is proportional to the intensity of the sensed x-ray radiation. The dual-energy sensor 455 also includes a photodetector, or other detector that is sensitive to visible light, that senses the visible light signal from the scintillator and produces an electrical signal in response. The current of the electrical signal is proportional to the intensity of the detected visible light, thus, the value of the electrical signal provides an indication of the intensity of the detected x-ray radiation. The electrical signal may be digitized by an analog-to-digital converter, and the digitized signal may be used to generate an image of the physical region 405 that represents the attenuation of the x-ray radiation by the physical region 405. Two such images may be generated, one representing the attenuation of the lower-energy x-ray from the dual-energy source 415 and the other representing the attenuation of the higher-energy x-ray from the dual-energy source 415. These images may be used to determine the effective atomic number of various portions of the physical region 405.

The sensor system 460 also includes a fission product sensor 460 that is sensitive to fission products emitted from the physical region 405 in response to being irradiated with neutral particles from the neutral particle source 420. The fission product sensor 460 may be an array of scintillators that detect freed neutrons and/or gamma rays. For example, the fission product sensor 460 may be liquid or plastic scintillators and/or germanium (Ge) or high-performance germanium (HPGe) detectors.

The sensor system 450 also includes the absorption analyzer 465 that determines absorption characteristics of the region of interest based on the radiation sensed by the dual-energy sensor 455. The absorption analyzer 465 determines the effective atomic number of various portions of the physical region 405, compares the effective atomic number to a pre-set threshold value to determine whether any of the various portions are regions of interest, and identifies locations corresponding to any regions of interest. The materials identifier 470 determines whether a fissionable material is present based on data from the fission product sensor 460.

The sensor system 450 also includes a processor 475, an electronic storage 480, and an input/output module 485. The electronic storage 480 stores instructions, that when executed, cause the processor 475 to determine absorption characteristics (such as effective atomic number) of the physical region 405 that is scanned by the dual-energy x-rays produced by the dual-energy source 415 and imaged by detecting attenuated x-ray radiation at the sensor system 450. The electronic storage 480 may store a pre-determined threshold value for an effective atomic number above which a region is considered a region of interest. The electronic storage 435 also includes instructions that, when executed, cause the processor 475 and the materials identifier 470 to determine whether fissionable materials are present in the physical region 405. The electronic storage 435 also includes instructions, that when executed, cause the processor 475 to determine a location corresponding to an identified region of interest and to provide the location to the source system 410.

The electronic storage 480 is an electronic memory module, and the electronic storage 480 may be a non-volatile or persistent memory. The processor 475 may be a processor suitable for the execution of a computer program such as a general or special purpose microprocessor, and any one or more processors of any kind of digital computer. Generally, a processor receives instructions and data from a read-only memory or a random access memory or both. In some implementations, the sensor system 450 includes more than one processor.

The input/output module 485 may be any device able to transmit data to, and receive data from, the sensor system 450. For example, the input/output module 485 may be a mouse, a touch screen, a stylus, a keyboard, or any other device that enables a user to interact with the sensor system 450. In some implementations, the input/output module 485 may be configured to receive an input from an automated process or a machine and/or configured to provide an output to an automated process or a machine.

Figure 5:
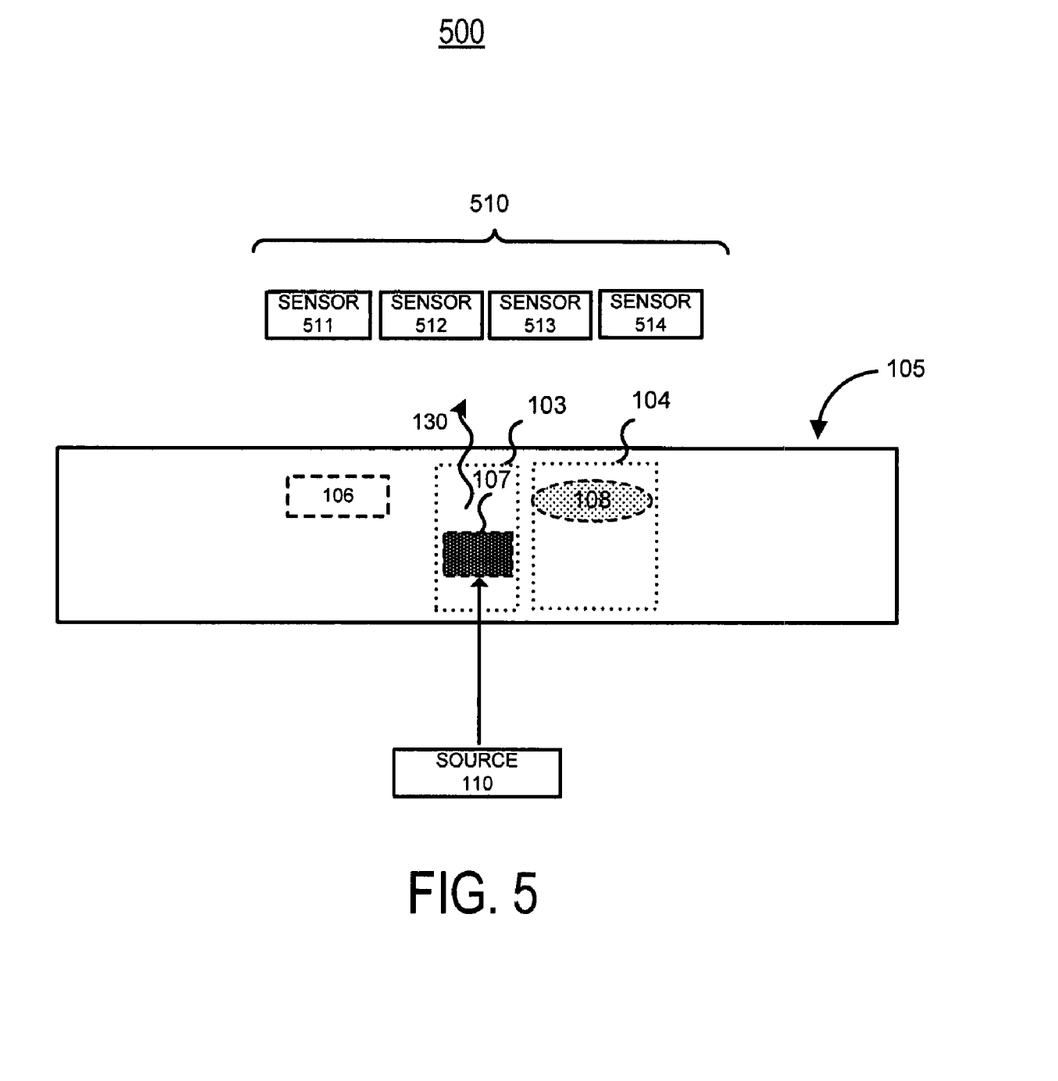

Referring to FIG. 5, a plan view of another example system 500 for discriminating fissionable materials from non-fissionable materials that have a relatively high effective atomic number. Like the system 100 discussed above with respect to FIGS. 1A-1C, the system 500 may operate in a screening mode and a verification mode. In the screening mode, the source 110 emits dual-energy x-ray radiation, and in the verification mode, the source 110 emits neutral particles having energy sufficient to cause fission in fissionable materials.

The system 500 includes a sensor system 510 having multiple detectors 511, 512, 513, and 514 that are placed along the physical region 105 to capture and sense the fission product 130 emitted from the region of interest 103 during the verification mode. Because fission products may be emitted equally in all directions (e.g., fission products are isotropically radiated), the sensor system 510 may be able to collect more fission products and produce a higher signal-to-noise ratio, thus improving the accuracy of the system 500 in detecting fissionable materials.

A plain view of the system is shown in FIG. 5, which illustrates that the detectors 511, 512, 513, and 514 are placed equidistant from the physical region 105, the sensor system 510 also may include additional detectors (not shown) that are vertically above or below the detectors 511, 512, 513, and 514 and are equidistant from the physical region 105. Additionally, the sensor system 510 may include more or fewer detectors. In some implementations, the detectors included in the sensor system 510 may be arranged such that they are not equally spaced with respect to each other and/or the detectors included in the sensor system 510 may not be equidistant to the physical region 105.

Figure 6:
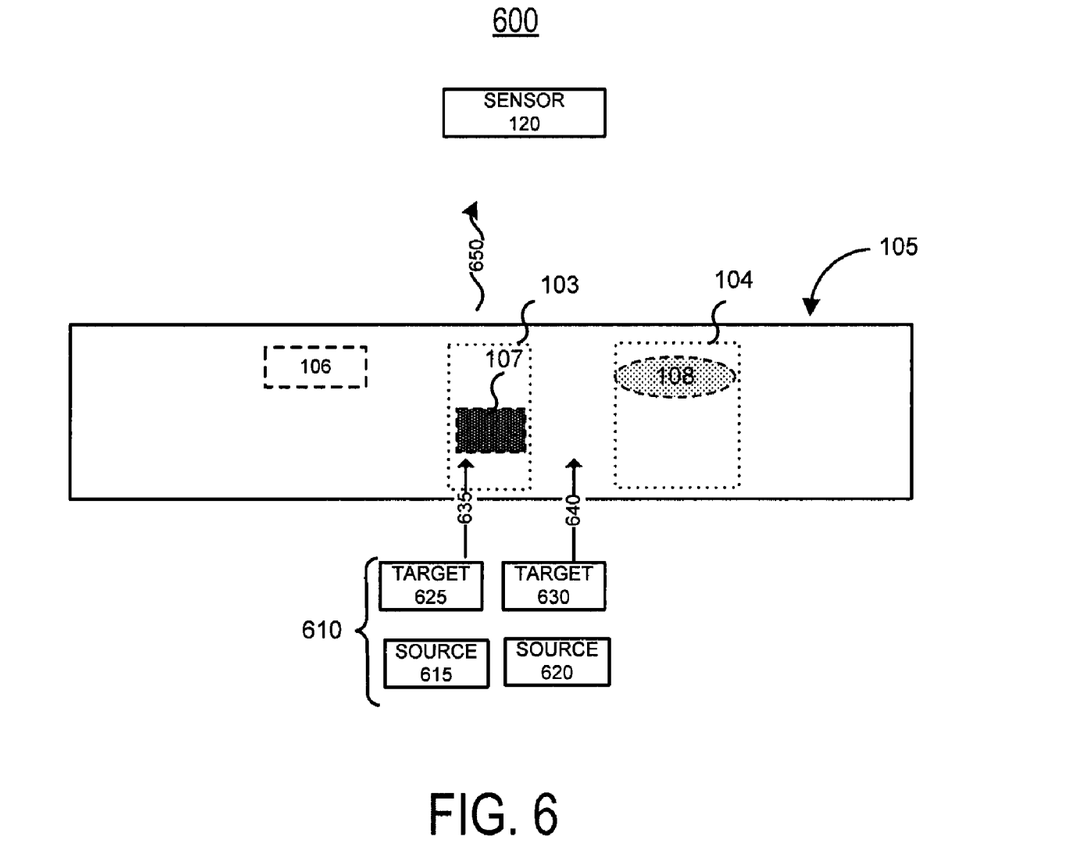

Referring to FIG. 6, a plan view of another example system 600 for discriminating fissionable materials from non-fissionable materials that have a relatively high effective atomic number. The system 600 also may be used to determine whether a fissionable material is also a weaponizable material.

Like the system 100 discussed above with respect to FIGS. 1A-1C, the system 600 may operate in a screening mode and a verification mode. In the screening mode, the source 610 emits dual-energy x-ray radiation, and in the verification mode, the source 610 emits neutral particles having energy sufficient to cause fission in fissionable materials. The source 610 includes sources 615 and 620, each of which produce x-ray radiation. The source 615 produces lower-energy x-ray radiation, and the source 620 produces higher-energy x-ray radiation. For example, in the screening mode, the source 615 may produce x-ray radiation having an energy of 6 MeV, and in the verification mode, the source 615 may produce x-ray radiation having an energy of 4 MeV. In the screening mode, the source 620 may produce x-ray radiation having an energy of 9 MeV, and in the verification mode, the source 620 may produce x-ray radiation having an energy of 10 MeV.

In the verification mode, the radiation emitted from the sources 615 and 620 interacts with photo-neutron conversion targets 625 and 630, respectively. The conversion targets 625 may be made of different materials. For example, the conversion target 625 may be made of beryllium and the conversion target 630 may be made of deuterium. The interactions between the radiation from the sources 615 and 620 and the conversion targets 625 and 630 result in the production of neutrons 635 and 640. The neutron 635 may be a "slow" neutron having an energy of less than 1 MeV, and the neutron 640 may be a "fast" neutron having an energy greater than 2 MeV. The "slow" neutron 635 causes fission only in certain fissionable materials, such as special nuclear materials and other weaponizable materials. In contrast, the "fast" neutron 640 may cause fission in almost all fissionable materials. Thus, by irradiating the region of interest 103 (which was identified as including a fissionable material) with both the "fast" neutron 640 and the "slow" neutron 635, the region of interest 103 may be examined to determine whether the region of interest 103 includes weaponizable materials. As shown in the example, the region of interest 103 emits fission product 650 in response to being irradiated with the "slow" neutron 635. Thus, the region of interest includes a special nuclear material or another type of weaponizable material.

In some implementations, the techniques discussed above may provide advantages including, for example, increased throughput of cargo and automatic detection of nuclear material. For example, because a dual-energy x-ray system is used to first identify regions of interest based on effective atomic number, only portions of the physical region under examination are further probed with neutral particles to determine the presence of fissionable materials.

A number of implementations have been described. Nonetheless, it is understood that other implementations are within the scope of the claims.

What is claimed is:

1. A system for detecting the presence of fissionable material, the system comprising:
   a source of radiation that is switchable between a screening mode and a verification mode, the source configured to:
      produce, in the screening mode, a first type of radiation having a first energy and a second type of radiation having a second energy, the second energy being higher than the first energy,
      direct, in the screening mode, the first type of radiation and the second type radiation toward a physical region, such that the first type of radiation propagates towards the physical region in a first direction and the second type of radiation propagates towards the physical region in a second direction that is substantially parallel to the first direction;
      produce, in the verification mode, a third type of radiation, and
      direct, in the verification mode, the third type of radiation toward the physical region, the third type of radiation being sufficient to induce fission in a fissionable material;
   a sensor system comprising:
      a sensor configured to sense radiation comprising the first energy and the second energy from the physical region, and
      a sensor configured to sense a fission product; and
   a processor operable to:
      access data sensed by the sensor configured to sense radiation comprising the first energy and the second energy,
      determine, for the physical region represented by the accessed data, an absorption of the first type of radiation and the second type of radiation,
      determine whether the physical region is a region of interest based on the absorption, and
      cause the source of radiation to switch from the screening mode to the verification mode when the physical region is a region of interest.

2. The system of claim 1, wherein the first type of radiation is x-ray radiation, and the second type of radiation is x-ray radiation.

3. The system of claim 2, wherein to determine whether the physical region is a region of interest based on the absorption, the processor is operable to determine an effective atomic number of the physical region.

4. The system of claim 1, wherein the third type of radiation is x-ray radiation having an energy that is higher than the energy of the first energy.

5. The system of claim 4, wherein the first type of x-ray radiation has an energy spectrum with a maximum energy of 6 MeV, the second type of x-ray radiation has an energy spectrum with a maximum energy of 9 MeV, and the third type of x-ray radiation has an energy spectrum with a maximum energy of 10 MeV.

6. The system of claim 1, wherein the first type of radiation, the second type of radiation, and the third type of radiation are the same type of radiation.

7. The system of claim 1, wherein the first type of radiation, the second type of radiation, and the third type of radiation are different types of radiation.

8. The system of claim 1, further comprising a track configured to:
   support the source, and
   enable the source to move along the track with respect to the physical region.

9. The system of claim 8, wherein the source and the sensor system move concurrently with respect to the physical region.

10. The system of claim 9, wherein the physical region is a region within a larger region, the source moves with respect to the larger region during the screening mode, and the physical region is determined to be a region of interest, and further comprising moving the source to the physical region during the verification mode.

11. The system of claim 1, further comprising a photo-neutron conversion target configured to produce, in response to interaction with the third type of radiation, a neutron of sufficient energy to cause fission in a fissionable material.

12. The system of claim 11, wherein the photo-neutron conversion target is made of beryllium, deuterium, or lithium.

13. The system of claim 11, wherein the conversion target is between the source and the physical region.

14. The system of claim 13, wherein the conversion target is coupled to the source.

15. The system of claim 1, wherein the source of radiation comprises a first source of radiation and a second source of radiation that is separate from the first source of radiation, the first source of radiation producing the first type of radiation and the second type of radiation in the screening mode, and the second source of radiation producing the third type of radiation in the verification mode.

16. The system of claim 1, wherein the first type of radiation, the second type of radiation, and the third type of radiation are produced by a single source of radiation that is configured to operate in multiple modes, including the screening mode and the verification mode.

17. A method of detecting the presence of fissionable material, the method comprising:
   directing, from an imaging system in a screening mode, a first type of radiation towards a physical region, the first type of radiation having a first energy;
   directing, from the imaging system in the screening mode, a second type of radiation towards the physical region, the second type of radiation having a second energy that is higher than the first energy, and the second type of radiation propagating in a direction that is substantially parallel to a direction of propagation of the first type of radiation;
   determining an absorption characteristic of the physical region based on an absorption of the first type of radiation and the second type of radiation by the physical region;
   determining, from the absorption characteristic, whether the physical region is a region of interest;
   switching the imaging system from the screening mode to a verification mode in response to determining that the physical region is a region of interest;
   directing, from the imaging system in the verification mode, a third type of radiation toward the physical region, the third type of radiation being sufficient to induce fission in a fissionable material; and
   determining whether a fissionable material is present in the physical region based on an interaction between the third radiation and the physical region.

18. The method of claim 17, wherein the first type of radiation is x-ray radiation, the second type of radiation is x-ray radiation, and the third type of radiation is a photon or a neutron.

19. The method of claim 17, further comprising detecting radiation from a fission product emitted from the physical region after the source of the third type of radiation is turned off.

20. The method of claim 17, wherein the absorption characteristic comprises an effective atomic number.

21. The method of claim 17, wherein the physical region is a region of interest, and further comprising:
moving the imaging system during the screening mode, and
moving the imaging system to the physical region at the beginning of the verification mode.

22. The method of claim 17, further comprising identifying fissionable material.

23. An imaging system for discriminating fissionable materials from among other high-effective atomic number materials, the imaging system comprising:
a source configured to:
produce dual-energy x-ray radiation sufficient to cause fission in fissionable materials, the dual-energy x-ray radiation comprising a first beam of energy at a first energy and a second beam of energy at a second energy, and
direct the dual-energy x-ray radiation sufficient to cause fission in fissionable materials towards a physical region, the first beam of energy propagating in a direction that is substantially parallel to a direction of propagation of the second beam of energy;
a sensor configured to sense x-ray radiation and a product of fission from the physical region;
a processor configured to:
determine an absorption of the dual-energy x-ray radiation by the physical region based on the sensed x-ray radiation, and
determine whether the physical region includes fissionable material based on the presence of a product of fission.

24. The system of claim 1, wherein the processor is further operable to cause the sensor system to switch between the screening mode and the verification mode when the physical region is a region of interest.

25. The system of claim 1, wherein the third type of radiation comprises a neutral particle.

26. The system of claim 1, wherein both the sensor configured to sense radiation comprising the first energy and the second energy and the sensor configured to sense a fission product are mounted on a single gantry.

27. The system of claim 1, wherein the third type of radiation propagates along a direction that is substantially parallel to the first direction.

28. The method of claim 17, further comprising:
determining a characteristic of the region of interest,
modifying the third type of radiation based on the characteristic, and
scanning the region of interest with the modified third type of radiation.

29. The method of claim 28, wherein the characteristic of the region of interest comprises an effective atomic number, and modifying the third type of radiation comprises selecting the third type of radiation based on the effective atomic number.

30. The method of claim 29, wherein selecting the third type of radiation based on the effective atomic number comprises selecting one of a neutron probe or a photon probe.

31. The method of claim 17, further comprising presenting a perceivable indication when a fissionable material is present.

* * * * *

UNITED STATES PATENT AND TRADEMARK OFFICE
CERTIFICATE OF CORRECTION

| | | |
|---|---|---|
| PATENT NO. | : 8,106,365 B2 | Page 1 of 1 |
| APPLICATION NO. | : 12/426179 | |
| DATED | : January 31, 2012 | |
| INVENTOR(S) | : David Perticone and Vitaliy Ziskin | |

It is certified that error appears in the above-identified patent and that said Letters Patent is hereby corrected as shown below:

At Claim 1, Col. 17, line 17, replace "type" with --type of--.

Signed and Sealed this
Twenty-fifth Day of September, 2012

David J. Kappos
*Director of the United States Patent and Trademark Office*